(12) United States Patent
He et al.

(10) Patent No.: US 12,233,561 B2
(45) Date of Patent: Feb. 25, 2025

(54) MULTI-SENSOR FUSION SLAM SYSTEM, MULTI-SENSOR FUSION METHOD, ROBOT, AND MEDIUM

(71) Applicant: SHENZHEN PUDU TECHNOLOGY CO., LTD., Guangdong (CN)

(72) Inventors: Kejun He, Shenzhen (CN); Meiwen Chen, Shenzhen (CN); Cong Guo, Shenzhen (CN)

(73) Assignee: SHENZHEN PUDU TECHNOLOGY CO., LTD., Guangdon (CN)

( * ) Notice: Subject to any disclaimer, the term of this patent is extended or adjusted under 35 U.S.C. 154(b) by 261 days.

(21) Appl. No.: 17/793,770

(22) PCT Filed: Dec. 9, 2020

(86) PCT No.: PCT/CN2020/135026
§ 371 (c)(1),
(2) Date: Jul. 19, 2022

(87) PCT Pub. No.: WO2021/147546
PCT Pub. Date: Jul. 29, 2021

(65) Prior Publication Data
US 2023/0066441 A1 Mar. 2, 2023

(30) Foreign Application Priority Data
Jan. 20, 2020 (CN) .......................... 202010064034.2

(51) Int. Cl.
*B25J 9/16* (2006.01)
(52) U.S. Cl.
CPC ............. *B25J 9/1697* (2013.01); *B25J 9/161* (2013.01); *B25J 9/162* (2013.01); *B25J 9/163* (2013.01)

(58) Field of Classification Search
CPC ... B25J 9/161; B25J 9/162; B25J 9/163; B25J 9/1697; G06V 20/52; G06V 10/82;
(Continued)

(56) References Cited

U.S. PATENT DOCUMENTS 10,151,588 B1   12/2018 Singh et al.
2017/0374342 A1  12/2017 Zhao
(Continued)

FOREIGN PATENT DOCUMENTS

CN   104764457   7/2015
CN   107246876   10/2017
(Continued)

OTHER PUBLICATIONS

Zhang et al., "A Visual SLAM System with Laser Assisted Optimization", 2019 IEEE (Year: 2019).*
(Continued)

*Primary Examiner* — John H Le
(74) *Attorney, Agent, or Firm* — Dority & Manning, P.A.

(57) ABSTRACT

A multi-sensor fusion SLAM system and a robot. The system operates on a mobile robot and comprises: a visual inertia module, a laser scanning matching module, a loop closure detection module, and a visual laser image optimization module. According to the multi-sensor fusion SLAM system and the robot, the calculation amount of laser matching constraint optimization can be reduced by using a voxel subgraph so that the pose calculation is more accurate, accumulated errors of long-time operation of the system can be corrected in time by means of sufficient fusion of modules, and the robustness of the system and the accuracy of positioning and mapping are integrally improved.

6 Claims, 3 Drawing Sheets

(58) Field of Classification Search
CPC .......... G01S 17/42; G01S 17/86; G01S 17/89; G01S 7/4808; G01C 21/1652; G01C 21/1656
USPC .......................................................... 702/150
See application file for complete search history.

(56) References Cited

U.S. PATENT DOCUMENTS

| | | | |
|---|---|---|---|
| 2018/0239351 | A1 | 8/2018 | Liang |
| 2019/0346271 | A1* | 11/2019 | Zhang ................ G01C 21/1656 |

FOREIGN PATENT DOCUMENTS

| | | |
|---|---|---|
| CN | 107450577 | 12/2017 |
| CN | 108073167 | 5/2018 |
| CN | 108665540 A | 10/2018 |
| CN | 109144057 | 1/2019 |
| CN | 109828588 | 5/2019 |
| CN | 109917786 | 6/2019 |
| CN | 109974712 | 7/2019 |
| CN | 110261870 | 9/2019 |
| CN | 110262546 | 9/2019 |
| CN | 110428467 A | 11/2019 |
| CN | 110706279 | 1/2020 |
| CN | 111258313 | 6/2020 |
| WO | WO2018055861 | 3/2018 |
| WO | WO2018140701 A1 | 8/2018 |

OTHER PUBLICATIONS

European Search Report for corresponding Application No. 20916000.1, dated Dec. 12, 2023, 8 pages.
International Search Report and Written Opinion (w/ English translation) for corresponding PCT Application No. PCT/CN2020/135026, mailed Mar. 3, 2021, 14 pages.
Chinese Office Action for corresponding Chinese Application No. 202010064034.2, dated Mar. 31, 2021, 25 pages.
Chinese Office Action for corresponding Chinese Application No. 202010064034.2, dated Oct. 11, 2021, 6 pages.
Shao et al., "Stereo Visual Inertial LiDAR simultaneous Localization and Mapping", arXiv: 1902.10741v1, Feb. 27, 2019, 8 pages.
Zhongze et al., "Real-time LiDAR SLAM in Off-road Environment for UGV", (Abstract Only), Acta Armamentarii, vol. 40, No. 12, Dec. 2019, 8 pages.

* cited by examiner

MULTI-SENSOR FUSION SLAM SYSTEM, MULTI-SENSOR FUSION METHOD, ROBOT, AND MEDIUM

CROSS-REFERENCES TO RELATED APPLICATIONS

This application is a US National Phase Application of international Patent Application No. PCT/CN2020/135026, filed Dec. 9, 2020, which, in turn, claims priority to Chinese patent application No. 202010064034.2, entitled "MULTI-SENSOR FUSION SLAM SYSTEM AND ROBOT" and filed with the Chinese patent office on Jan. 20, 2020, the entire contents of both of which are incorporated herein by reference.

TECHNICAL FIELD

The present disclosure relates to the field of robot technologies, and more particularly, to a multi-sensor fusion SLAM system, a multi-sensor fusion method, a robot, and a medium.

BACKGROUND

SLAM (simultaneous localization and mapping) technology has been extensively studied in the past decades. Although the SLAM technology solves the problem of simultaneous localization and mapping of robots in unknown environments, there are still challenges in dealing with diverse environments and long continuous operation. SLAM can operate on a wide variety of sensors. Over the past few years, a lidar-based SLAM system has become more popular than a vision-based system due to robustness to environmental changes. However, pure lidar systems have drawbacks, which may fail in environments with repeated structures such as tunnels or corridors.

SUMMARY

In these challenging environments, advantages of various sensors are required to be fully utilized in positioning and mapping.

In view of this, an objective of the present disclosure is to provide a multi-sensor fusion SLAM system, a multi-sensor fusion method, a robot, and a medium, so as to integrally improve the robustness of the system and the accuracy of positioning and mapping.

In order to achieve the above objective, the following technical solutions are provided in implementation of the present disclosure.

The present disclosure provides a multi-sensor fusion SLAM system operating on a mobile robot. The multi-sensor fusion SLAM system includes:

a laser scanning matching module configured to use the pose information as an initial value, match laser scanned point cloud with a voxel map to solve an advanced pose, integrate the point cloud into the voxel map according to the advanced pose, and derive a new voxel subgraph, the laser scanning matching module being configured to a laser matching constraint;

a loop closure detection module configured to extract an image descriptor of a visual keyframe by using a deep neural network, compare the image descriptor with an image descriptor of a previous keyframe to determine whether a closed loop exists, and if the closed loop exists, determine pose transformation of the two keyframes by using a perspective-n-point (PnP) method, solve a loop closure pose constraint according to the pose transformation and the voxel subgraph, and send the loop closure pose constraint to the laser scanning matching module; and a visual laser image optimization module configured to correct an accumulated error of the system according to the pose information, the laser matching constraint, and the loop closure pose constraint after the closed loop occurs.

In this case, the calculation amount of laser matching constraint optimization can be reduced by using the voxel subgraph so that the pose calculation is more accurate, an accumulated error of long-time operation of the system can be corrected in time by means of sufficient fusion of modules, and the robustness of the system and the accuracy of positioning and mapping are integrally improved.

The laser scanned point cloud is matched with the voxel map to solve the advanced pose by using an iterative closest point (ICP) algorithm.

The visual inertia module includes a visual front-end unit, an inertial measurement unit (IMU) pre-integration unit, and a sliding window optimization unit. The visual front-end unit is configured to select the keyframe. Thea IMI pre-integration unit is configured to generate an MU observation value. The sliding window optimization unit is configured to jointly optimize a visual reprojection error, an inertial measurement error, and a mileage measurement error.

It follows from the above that the MU pre-integration unit can remove the influence of acceleration of gravity on poses and speeds, so that a newly defined IMU Observation value is irrelevant to a pose and a speed of integration of the initial value, and the optimization is sped up without repeated re-integration during the optimization, thereby improving the efficiency of the sliding window optimization unit in calculating a Jacobian matrix and a covariance matrix of pre-integration increments and pre-integration errors of adjacent frames. The sliding window optimization unit adopts window optimization instead of global optimization, which can significantly reduce the calculation amount and ensure the calculation speed. The visual inertia module can output real-time accurate pose information for the laser scanning matching module.

The visual front-end unit takes a monocular camera or binocular camera as input, the monocular camera or binocular camera being configured to capture initial images. The visual front-end unit tracks feature points of each frame by using a Kanade-Lucas-Tomasi (KLT) sparse optical flow algorithm. The visual front-end unit includes a detector. The detector detects corner features and keeps a minimum number of the feature points in each of the initial images. The detector is configured to set a minimum pixel interval between two adjacent feature points. The visual front-end unit removes distortion of the feature points, removes mismatched feature points by using a random sample consensus (RANSAC) algorithm and a fundamental matrix model, and projects correctly matched feature points onto a unit sphere.

It follows from the above that the feature points can be further optimized.

The selecting the keyframe specifically includes: determining whether an average parallax of the tracked feature points between a current frame and the latest keyframe exceeds a threshold, taking the current frame as a new keyframe if the average parallax exceeds a first threshold, and taking the frame as the new keyframe if the number of the tracked feature points of the frame is below a second threshold.

In this case, complete loss of feature tracking is prevented.

The laser scanning matching module includes a lidar. The lidar is configured to acquire a scanning point, transform the scanning point according to the pose information and the EMU observation value, and convert the scanning point into a three-dimensional point cloud in a coordinate system where the robot is located at a current moment.

It follows from the above that serious motion distortion generated when a rotation speed of the lidar is slower than a moving speed of the robot can be prevented, thereby significantly improving the accuracy of pose estimation.

The loop closure detection module includes a similarity detection unit, a visual pose solving unit, and a laser pose solving unit. The similarity detection unit is configured to extract an image descriptor of a current keyframe, compare the image descriptor with an image descriptor of a keyframe in a keyframe data set, select a similar keyframe with highest similarity, and insert the similar keyframe into the keyframe data set. The visual pose solving unit is configured to match feature points of the current keyframe and the similar keyframe through a fast feature point extraction and description algorithm, remove mismatched feature points by using a RANSAC algorithm and a fundamental matrix model, and when the number of correctly matched feature points reaches a third threshold, solve relative pose transformation from the current keyframe to the similar keyframe by using the RANSAC algorithm and the PnP method. The laser pose solving unit is configured to select two voxel subgraphs associated with the current keyframe and the similar keyframe respectively, take the relative pose transformation as the initial value, and match the two voxel subgraphs by using an ICP algorithm, to obtain final relative pose transformation.

A multi-sensor fusion method is also provided. The method is applied to the multi-sensor fusion SLAM system as described above, and the method includes:

acquiring pose information;

using the pose information as an initial value, matching laser scanned point cloud with a voxel map to solve an advanced pose, integrating the point cloud into the voxel map according to the advanced pose, and deriving a new voxel subgraph;

acquiring a laser matching constraint;

extracting an image descriptor of a visual keyframe by using a deep neural network, comparing the image descriptor with an image descriptor of a previous keyframe to determine whether a closed loop exists, and if the closed loop exists, determining pose transformation of the two keyframes by using a PnP method, and solving a loop closure pose constraint according to the pose transformation and the voxel subgraph; and correcting an accumulated error of the system according to the pose information, the laser matching constraint, and the loop closure pose constraint after the closed loop occurs.

A robot is further provided. The robot includes a processor and a memory, the memory storing a computer program, the processor being configured to execute the computer program to perform steps of the multi-sensor fusion method as described above.

A computer storage medium is further provided. The computer storage medium stores a computer program. When the computer program is executed, steps of the multi-sensor fusion method as described above are performed.

In this case, the speed and accuracy of loop closure detection in cases of a change in a viewing angle of the robot, a change in the environmental brightness, a weak texture, etc. can be significantly improved.

The present disclosure further provides a robot including the multi-sensor fusion SLAM system as described above.

According to the multi-sensor fusion SLAM system and the robot provided in the present disclosure, the calculation amount of laser matching constraint optimization can be reduced by using the voxel subgraph so that the pose calculation is more accurate, an accumulated error of long-time operation of the system can be corrected in time by means of sufficient fusion of modules, and the robustness of the system and the accuracy of positioning and mapping are integrally improved.

DETAILED DESCRIPTION OF THE EMBODIMENTS

Figure 1:
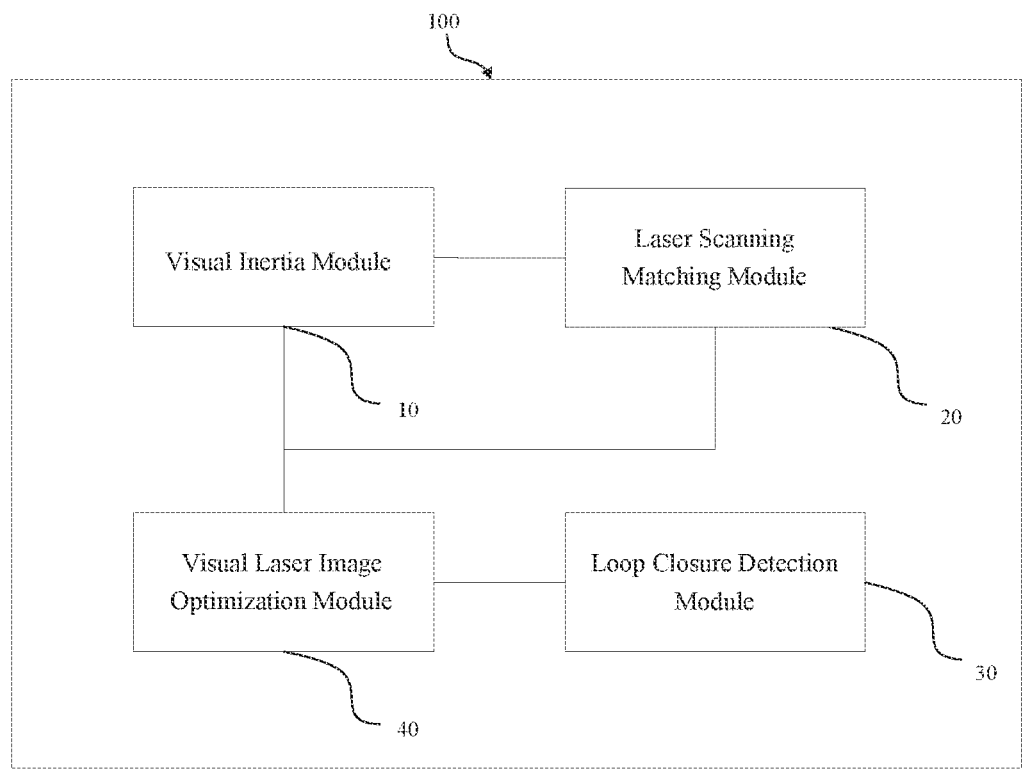
FIG. 1 is a schematic diagram illustrating a multi-sensor fusion SLAM system according to an implementation of the present disclosure.

Preferred implementations of the present disclosure are described in detail below with reference to the accompanying drawings. In the following description, the same components are denoted by the same reference numerals, and the description thereof will not be repeated. In addition, the accompanying drawings are merely schematic, and ratio of dimensions of the components or shapes of the components may be different from the actual ones.

Implementations of the present disclosure relate to a multi-sensor fusion SLAM system and a robot.

As shown in FIG. 1, a multi-sensor fusion SLAM system 100 operates on a mobile robot. The multi-sensor fusion SLAM system includes: a visual inertia module 10, a laser scanning matching module 20, a loop closure detection module 30, and a visual laser image optimization module 40. The visual inertia module 10 is configured to output pose information. The laser scanning matching module 20 is configured to use the pose information as an initial value, match laser scanned point cloud with a voxel map to solve an advanced pose, integrate the point cloud into the voxel map according to the advanced pose, and derive a new voxel subgraph. The laser scanning matching module is configured to generate a laser matching constraint. The loop closure detection module 30 is configured to extract an image descriptor of a visual keyframe by using a deep neural network, compare the image descriptor with an image descriptor of a previous keyframe to determine whether a closed loop exists, and if the closed loop exists, determine pose transformation of the two keyframes by using a PnP method, solve a loop closure pose constraint according to the pose transformation and the voxel subgraph, and send the loop closure pose constraint to the laser scanning matching module. The visual laser image optimization module 20 is configured to correct an accumulated error of the system according to the pose information, the laser matching constraint, and the loop closure pose constraint after the closed loop occurs. In this case, the calculation amount of laser matching constraint optimization can be reduced by using a voxel subgraph so that the pose calculation is more accurate, an accumulated error of long-time operation of the system can be corrected in time by means of sufficient fusion of modules, and the robustness of the system and the accuracy of positioning and mapping are integrally improved.

In this implementation, the laser scanned point cloud is matched with the voxel map to solve the advanced pose by using an ICP algorithm.

Figure 2:
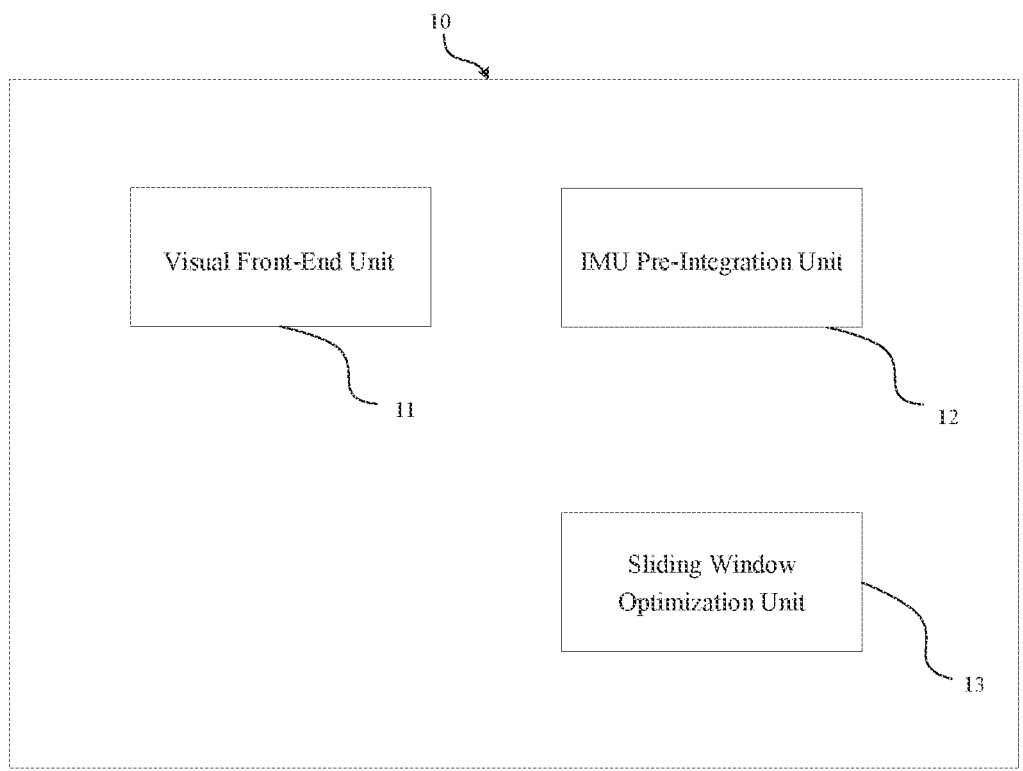
FIG. 2 is a schematic diagram illustrating a visual inertia module of the multi-sensor fusion SLAM system according to an implementation of the present disclosure.

As shown in FIG. 2, in this implementation, the visual inertia module 10 includes a visual front-end unit 11, an IMU pre-integration unit 12, and a sliding window optimization unit 13. The visual front-end unit 11 is configured to select the keyframe. The IMU pre-integration unit 12 is configured to generate an IMU observation value. The sliding window optimization unit 13 is configured to jointly optimize a visual reprojection error, an inertial measurement error, and a mileage measurement error. Thus, the IMU pre-integration unit can remove the influence of acceleration of gravity on poses and speeds, so that a newly defined IMU observation value is irrelevant to a pose and a speed of integration of the initial value, and the optimization is sped up without repeated re-integration during the optimization, thereby improving the efficiency of the sliding window optimization unit in calculating a Jacobin matrix and a covariance matrix of pre-integration increments and pre-integration errors of adjacent frames. The sliding window optimization unit adopts window optimization instead of global optimization, which can significantly reduce the calculation amount and ensure the calculation speed. The visual inertia module can output real-time accurate pose information for the laser scanning matching module.

In this implementation, the visual front-end unit 11 takes a monocular camera or binocular camera as input. The monocular camera or binocular camera captures initial images. The visual front-end unit 11 tracks feature points of each frame by using a KU' sparse optical flow algorithm. The visual front-end unit 11 includes a detector. The detector detects corner features and keeps a minimum number of the feature points in each of the initial images. The detector is configured to set a minimum pixel interval between two adjacent feature points. The visual front-end unit 11 removes distortion of the feature points, removes mismatched feature points by using a RANSAC algorithm and a fundamental matrix model, and projects correctly matched feature points onto a unit sphere. Thus, the feature points can be further optimized.

In this implementation, preferably, the minimum number of the feature points in each image ranges from 100 to 300.

In this implementation, the selecting the keyframe specifically includes:

determining whether an average parallax of the tracked feature points between a current frame and the latest keyframe exceeds a threshold, taking the current frame as a new keyframe if the average parallax exceeds a first threshold, and taking the frame as the new keyframe if the number of the tracked feature points of the frame is below a second threshold. In this case, complete loss of feature tracking is prevented.

In this implementation, state variables in a sliding window of the sliding window optimization unit 13 are:

$$\chi = [x_0, x_1, \ldots x_n, x_c^b, \lambda_0, \lambda_1, \ldots \lambda_m]$$

$$x_k = [p_{b_k}^w, v_{b_k}^w, q_{b_k}^w, b_a, b_g] k \in [0, n]$$

$$x_c^b = [p_c^b, q_c^b, t_c^b]$$

where $x_k$ corresponds to an IMU state of a $k^{th}$-frame image, including a position, a speed, and an attitude of an IMU in the world coordinate system, and an accelerometer bias and a gyroscope bias in an IMU coordinate system, n and m denote the number of keyframes and the number of feature points in the sliding window respectively. $\lambda_1$ denotes an inverse depth of the $1^{st}$ feature point on its first observation frame. $x_c^b$ denotes external parameters from a camera to the IMU, including a position, an attitude, and a delay.

In order to calculate state variables in the sliding window, the formula is solved by nonlinear optimization. $r_B(\hat{Z}_{b_{k+1}}^{b_k}, x)$, $r_C(\hat{Z}_l^{C_j}, x)$ and $r_O(\hat{Z}_{O_{k+1}}^{O_k}, x)$ denote IMU, visual, and mileage measurement errors respectively. B denotes all IMI measurements in the window, C denotes a feature point observed at least twice in the window, and O denotes all mileage measurements in the window.

$$\min_\chi \left\{ \|r_p - H_p \chi\|^2 + \sum_{k \in B} \left\|r_B(\hat{z}_{b_{k+1}}^{b_k}, \chi)\right\|^2_{p_{b_{k+1}}^{b_k}} + \sum_{(i,j) \in C} \rho \left\|r_C(\hat{z}_l^{C_j}, \chi)\right\|^2_{p_l^{c_j}} + \sum_{k \in O} \left\|r_O(\hat{z}_{O_{k+1}}^{O_k}, \chi)\right\|^2_{p_{O_{k+1}}^{O_k}} \right\}$$

In some examples, in order to ensure a fixed window length, redundant keyframes are required to be discarded. However, in order to retain constraints of the discarded keyframes on other frames in the window there is a need to transform the discarded information into prior information. The transformation process is called marginalization and specifically realized by Schur complement calculation.

In this implementation, the laser scanning matching module 20 includes a lidar. The lidar acquires a scanning point, transforms the scanning point according to the pose information and the IMU observation value, and converts the scanning point into a three-dimensional point cloud in a coordinate system where the robot is located at a current moment. Thus, serious motion distortion generated when a rotation speed of the lidar is slower than a moving speed of the robot can be prevented, thereby significantly improving the accuracy of pose estimation.

In some examples, a two-dimensional or three-dimensional laser may be selected for the lidar. In order to reduce the calculation amount of three-dimensional laser matching, geometric features including edge points and planar points are required to be extracted.

Figure 3:
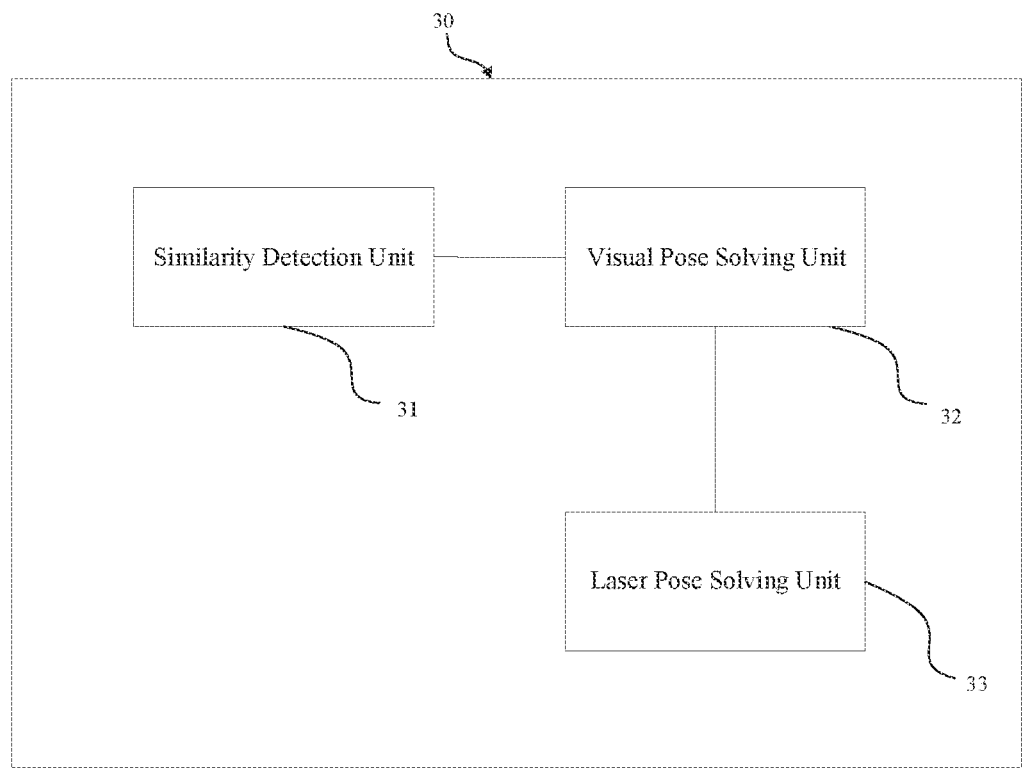
FIG. 3 is a schematic diagram illustrating a loop closure detection module of the multi-sensor fusion SLAM system according to an implementation of the present disclosure.

As shown in FIG. 3, in this implementation, the loop closure detection module 30 includes a similarity detection unit 31, a visual pose solving unit 32, and a laser pose solving unit 33. The similarity detection unit 31 extracts an image descriptor of a current keyframe, compares the image descriptor with an image descriptor of a keyframe in a keyframe data set, selects a similar keyframe with highest similarity, and inserts the similar keyframe into the keyframe data set. The visual pose solving unit 32 matches feature points of the current keyframe and the similar keyframe through a fast feature point extraction and description algorithm, removes mismatched feature points by using a RANSAC algorithm and a fundamental matrix model, and when the number of correctly matched feature points reaches a third threshold, solves relative pose transformation from the current keyframe to the similar keyframe by using the RANSAC algorithm and the PnP method. The laser pose solving unit 33 selects two voxel subgraphs associated with the current keyframe and the similar keyframe respectively, takes the relative pose transformation as the initial value, and matches the two voxel subgraphs by using an ICP algorithm, to obtain final relative pose transformation. In this case, the speed and accuracy of loop closure detection in cases of a change in a viewing angle of the robot, a change in the environmental brightness, a weak texture, etc. can be significantly improved.

In some examples, current loopback check is considered valid only when the number of interior points solved is greater than a set threshold.

In this implementation, the first threshold, the second threshold, and the third threshold may be any preset values.

An implementation of the present disclosure further relates to a robot. The robot includes the multi-sensor fusion SLAM system 100 as described above. The multi-sensor fusion SLAM system 100 is not described in detail herein. In this case, the robustness of the SLAM system of the robot and the accuracy of positioning and mapping are integrally improved.

Optionally, an embodiment of the present disclosure further provides a multi-sensor fusion method. The method is applied to the multi-sensor fusion SLAM system, and the method includes:
  acquiring pose information;
  using the pose information as an initial value, matching laser scanned point cloud with a voxel map to solve an advanced pose, integrating the point cloud into the voxel map according to the advanced pose, and deriving a new voxel subgraph;
  acquiring a laser matching constraint;
  extracting an image descriptor of a visual keyframe by using a deep neural network, comparing the image descriptor with an image descriptor of a previous keyframe to determine whether a closed loop exists, and if the closed loop exists, determining pose transformation of the two keyframes by using a PnP method, and solving a loop closure pose constraint according to the pose transformation and the voxel subgraph; and
  correcting an accumulated error of the system according to the pose information, the laser matching constraint, and the loop closure pose constraint after the closed loop occurs.

Optionally, an embodiment of the present disclosure further provides a robot. The robot includes a processor, a memory, a network interface, and a database connected through a system bus. The processor of the robot is configured to provide computing and control capabilities. The memory of the robot includes a non-volatile storage medium and an internal memory. The non-volatile storage medium stores an operating system, a computer program, and a database. The internal memory provides an environment for operation of the operating system and the computer program stored in the non-volatile storage medium. The network interface of the robot is configured to communicate with an external terminal through a network connection. The computer program is executed by the processor to perform a multi-sensor fusion method.

An embodiment of the present disclosure further provides a computer storage medium. The computer storage medium stores a computer program. When the computer program is executed, the multi-sensor fusion method as described above is performed.

Those of ordinary skill in the art can understand that some or all procedures in the methods in the foregoing embodiments may be implemented by a computer program instructing related hardware. The computer program may be stored in a non-volatile computer-readable storage medium, and when the computer program is executed, the procedures in the foregoing method embodiments may be implemented. Any reference to the memory, storage, database, or other media used in the embodiments provided in the present disclosure may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache memory. By way of illustration instead of limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The implementations described above do not limit the protection scope of the technical solution. Any modification, equivalent replacement or improvement made within the spirit and principles of the above implementation shall be included in the protection scope of the technical solution.

What is claimed is:

1. A multi-sensor fusion simultaneous localization and mapping (SLAM) system operating on a mobile robot, the multi-sensor fusion SLAM system comprising:
  a visual inertia module configured to output pose information;
  a laser scanning matching module configured to use the pose information as an initial value, match a laser scanned point cloud with a voxel map to solve an advanced pose, integrate the point cloud into the voxel map according to the advanced pose, and derive a new voxel map, the laser scanning matching module being configured to generate a laser matching constraint;
  a loop closure detection module configured to extract an image descriptor of a visual keyframe by using a deep neural network, compare the image descriptor with an image descriptor of a previous keyframe to determine whether a closed loop exists, and if the closed loop exists, determine pose transformation of the two keyframes by using a perspective-n-point (PnP) method, solve a loop closure pose constraint according to the pose transformation and the voxel map, and send the loop closure pose constraint to the visual laser image optimization module; and
  a visual laser image optimization module configured to correct an accumulated error of the system according to the pose information, the laser matching constraint, and the loop closure pose constraint after the closed loop occurs;
  wherein the visual inertia module includes:
  a visual front-end unit configured to select the keyframe;
  an inertial measurement unit (IMU) pre-integration unit configured to generate an IMU observation value; and
  a sliding window optimization unit configured to jointly optimize a visual reprojection error, an inertial measurement error, and a mileage measurement error;
  wherein the visual front-end unit takes a monocular camera or binocular camera as input, the monocular camera or binocular camera being configured to capture initial images,
  the visual front-end unit is configured to track feature points of each frame by using a Kanade-Lucas-Tomasi (KLT) sparse optical flow algorithm,
  the visual front-end unit includes a detector, the detector detecting corner features and keeping a minimum number of the feature points in each of the initial images, the detector being configured to set a minimum pixel interval between two adjacent feature points, and the visual front-end unit is configured to remove distortion of the feature points, remove mismatched feature points by using a random sample consensus (RANSAC) algorithm and a fundamental matrix model, and project correctly matched feature points onto a unit sphere;

wherein the laser scanned point cloud is matched with the voxel map to solve the advanced pose by using an iterative closest point (ICP) algorithm;

wherein the laser scanning matching module includes a lidar configured to acquire a scanning point, transform the scanning point according to the pose information and the IMU observation value, and convert the scanning point into a three-dimensional point cloud in a coordinate system where the robot is located at a current moment; and wherein the loop closure detection module includes:

a similarity detection unit configured to extract an image descriptor of a current keyframe, compare the image descriptor with an image descriptor of a keyframe in a keyframe data set, select a similar keyframe with highest similarity, and insert the similar keyframe into the keyframe data set;

a visual pose solving unit configured to match feature points of the current keyframe and the similar keyframe through a fast feature point extraction and description algorithm, remove mismatched feature points by using a RANSAC algorithm and a fundamental matrix model, and when the number of correctly matched feature points reaches a third threshold, solve relative pose transformation from the current keyframe to the similar keyframe by using the RANSAC algorithm and the PnP method; and a laser pose solving unit configured to select two voxel maps associated with the current keyframe and the similar keyframe respectively, take the relative pose transformation as the initial value, and match the two voxel maps by using an ICP algorithm, to obtain final relative pose transformation.

2. The multi-sensor fusion SLAM system of claim 1, wherein the selecting the keyframe specifically includes: determining whether an average parallax of the tracked feature points between a current frame and the latest keyframe exceeds a threshold, taking the current frame as a new keyframe if the average parallax exceeds a first threshold, and taking the frame as the new keyframe if the number of the tracked feature points of the frame is below a second threshold.

3. A robot, wherein the robot includes the multi-sensor fusion SLAM system of claim 1.

4. A multi-sensor fusion method, for a multi-sensor fusion simultaneous localization and mapping (SLAM) system, the method comprising:

acquiring pose information;

using the pose information as an initial value, matching laser scanned point cloud with a voxel map to solve an advanced pose, integrating the point cloud into the voxel map according to the advanced pose, and deriving a new voxel map;

generating a laser matching constraint;

extracting an image descriptor of a visual keyframe by using a deep neural network, comparing the image descriptor with an image descriptor of a previous keyframe to determine whether a closed loop exists, and if the closed loop exists, determining pose transformation of the two keyframes by using a perspective-n-point (PnP) method, and solving a loop closure pose constraint according to the pose transformation and the voxel map;

correcting an accumulated error of the system according to the pose information, the laser matching constraint, and the loop closure pose constraint after the closed loop occurs;

selecting the keyframe;

generating an inertial measurement unit (IMU) observation value;

optimizing jointly a visual reprojection error, an inertial measurement error, and a mileage error:

taking a monocular camera or binocular camera as input, and the monocular camera or binocular camera being configured to capture initial images;

tracking feature points of each frame by using Kanade-Lucas-Tomaski (KLT) sparse optical flow algorithm;

detecting corner features, keeping a minimum number of the feature points in each of the initial images, and setting a minimum pixel interval between two adjacent feature points;

removing distortion of the feature points, remove mismatched feature points by using a random sample consensus (RANSAC) algorithm and a fundamental matrix model, and project correctly matched feature points onto a unit sphere;

matching with the voxel map to solve the advanced pose by using an iterative closest point (ICP) algorithm;

acquiring a scanning point, transforming the scanning point into a three-dimensional point cloud in a coordinate system where the robot is located at a current moment;

extracting an image descriptor of a current keyframe, comparing the image descriptor with an image descriptor of a keyframe in a keyframe data set, selecting a similar keyframe with highest similarity, inserting the similar keyframe into the keyframe data set;

matching feature points of the current keyframe and the similar keyframe through a fast feature point extraction and description algorithm, removing mismatched feature points by using a RANSAC algorithm and a fundamental matrix model, and when the number of correctly matched feature points reaches a third threshold, solving relative pose transformation from the current keyframe to the similar keyframe using the RANSAC algorithm and the PnP method; and selecting two voxel maps associated with the current keyframe and the similar keyframe respectively, taking the relative pose transformation as the initial value, and matching the two voxel maps by using an ICP algorithm, to obtain the final relative pose transformation.

5. A robot, wherein the robot includes a processor and a memory, the memory storing a computer program, the processor being configured to execute the computer program to perform steps of the multi-sensor fusion method of claim 4.

6. A computer storage medium storing a computer program, wherein when the computer program is executed, steps of the multi-sensor fusion method of claim 4 are performed.

* * * * *